United States Patent [19]

Morgan

[11] 4,086,023

[45] Apr. 25, 1978

[54] WINDMILL

[75] Inventor: Burton D. Morgan, Hudson, Ohio

[73] Assignee: Concept Development Institute, Inc., Kent, Ohio

[21] Appl. No.: 620,855

[22] Filed: Oct. 8, 1975

[51] Int. Cl.² .............................................. F03D 3/06
[52] U.S. Cl. .................................. 416/132 B; 416/119; 416/197 A; 416/241 A
[58] Field of Search ........... 416/111, 119, 197, 197 A, 416/132, 132 A, 241 A, 240, 132 B

[56] References Cited

U.S. PATENT DOCUMENTS

| | | | |
|---|---|---|---|
| 302,769 | 7/1884 | Pallausch | 416/111 |
| 574,411 | 1/1897 | Gassett | 416/142 |
| 853,767 | 5/1907 | Caldwell | 416/116 |
| 1,315,692 | 9/1919 | Weed | 416/119 |
| 1,578,835 | 3/1926 | Kothe | 416/119 |
| 1,708,374 | 4/1929 | Adams | 416/DIG. 4 |
| 2,622,687 | 12/1952 | Cohen | 416/132 X |
| 3,038,543 | 6/1962 | Davidson | 416/132 X |
| 3,080,824 | 3/1963 | Boyd et al. | 416/132 A X |
| 3,697,765 | 10/1972 | Carini | 416/DIG. 4 |
| 3,758,231 | 9/1973 | Barnstead | 416/132 |
| 3,942,909 | 3/1976 | Yengst | 416/132 B |
| 3,976,396 | 8/1976 | Antogini | 416/117 X |

FOREIGN PATENT DOCUMENTS

| | | | |
|---|---|---|---|
| 33,793 | 10/1924 | Denmark | 416/119 |
| 583,330 | 1/1925 | France | 416/197 A |
| 611,080 | 9/1926 | France | 416/197 A |
| 666,386 | 10/1938 | Germany | 416/197 A |
| 267,581 | 9/1929 | Italy | 416/197 A |

*Primary Examiner*—Everette A. Powell, Jr.
*Attorney, Agent, or Firm*—Oldham, Oldham, Hudak & Weber

[57] ABSTRACT

The windmill includes a vertically positioned support shaft, a plurality of elongated, molded arcuate plastic vanes which are vertically positioned and operatively connected to the support shaft, which vanes are slightly flexible so winds engaging the vanes will flatten the arc of some vanes and will make the arc of other vanes tighter to provide unbalanced rotational forces on the vanes, and means operatively connect to the shaft to provide power therefrom on shaft rotation.

2 Claims, 5 Drawing Figures

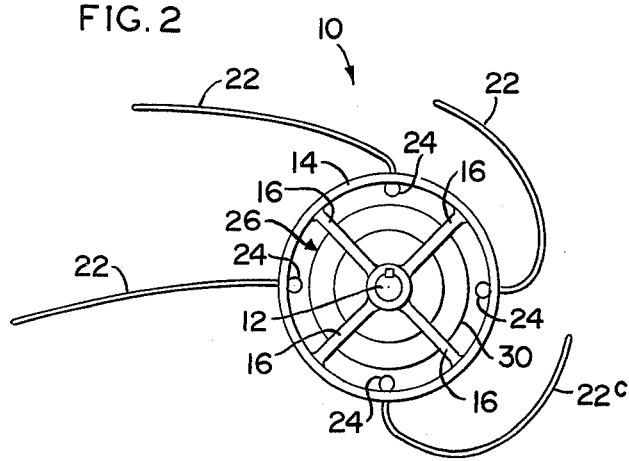
FIG. 2
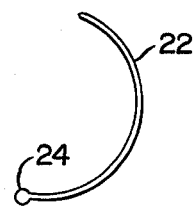
FIG. 3
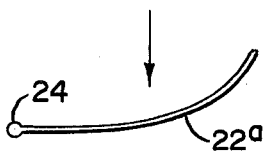
FIG. 4
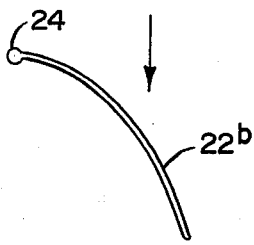
FIG. 5
FIG. 1

WINDMILL

BACKGROUND OF THE INVENTION

At the present time, appreciable efforts are being made to provide new and useful energy sources. Windmills, of course, have been a known source of natural energy for centuries, but many of such windmills are relatively costly and may comprise, cumbersome members. Also, most windmills are not adapted for supply of power from a relatively small, inexpensive windmill that could be used in many areas for supplying small amounts of power for a number of residential and/or industrial or farm uses.

The general object of the present invention is to provide a novel and improved windmill, especially to a windmill that can be made in a variety of sizes, and to the provision of a small, relatively lightweight, inexpensive windmill adapted to provide small amounts of power.

Another object of the invention is to provide a windmill which includes a plurality of arcuate molded plastic vanes therein and wherein the vanes, at most, are semi-rigid so that the vanes will be deflected by winds engaging the same; and wherein winds striking the convex sides of the vanes will tend to curl the vanes more tightly and wherein winds contacting the concave sides of vanes will tend to flatten the vanes or elongate the same to engage wind therewith and provide drive on a support shaft by unbalanced windage forces existing thereon.

Another object of the invention is to provide a windmill having a plurality of molded arcuate vanes therein and wherein the vanes can be made from a plastic such as Mylar and which vanes can be of a thickness in the order of about 0.010 inch.

The foregoing and other objects and advantages of the invention will be made more apparent as the specification proceeds.

Attention now is particularly directed to the accompanying drawings, wherein:

FIG. 1 is an elevation, partially in vertical section, of a windmill embodying the principles of the invention;

FIG. 2 is a plan view of the apparatus of FIG. 1; and

FIGS. 3, 4 and 5 are plan views of individual vanes of the windmill showing the deflection occurring thereto under different windage conditions.

When referring to corresponding members shown in the drawings and referred to the specification, corresponding numerals are used to facilitate comparison therebetween.

SUBJECT MATTER OF THE INVENTION

The present invention, as one embodiment thereof, relates to a windmill comprising a vertically positioned support shaft, a plurality of elongated molded plastic vanes that are of arcuate shape in horizontal section and are vertically positioned and operatively connected to the support shaft, the vanes being equally spaced circumferentially about the shaft and slightly flexible so that winds engaging said vanes will tend to flatten the arc of some vanes and will make the arc of other vanes tighter to provide unbalanced rotational wind engaging forces with the vanes, and means operatively connect to the support shaft to provide power therefrom on rotation of said shaft. The power supply means may comprise an electric alternator having its stator fixedly positioned and having its rotor operatively coupled to said support shaft for creation of electrical energy when said support shaft is driven.

Referring now to the details of the structure shown in the drawings, a windmill of the invention is indicated as a whole by the numeral 10. This windmill includes a vertically positioned support shaft 12 that is engaged with a tubular carrier device or support means 14 as by a spider member 16. The tubular device 16 and support shaft 12 form an assembly that is journalled on a suitable thrust bearing or equivalent 18. Such bearing 18 in turn is mounted at the upper end of a vertically positioned support 20. The tubular device 14 has a plurality of windmill vanes 22 secured thereto in any conventional manner. These vanes 22 preferably are molded from a light gage semi-rigid plastic material such as Mylar, which is a polyethylene terephthalate polyester, which Mylar may be, for example, of a thickness of about 0.010 inch. The vanes 22 are molded to have a permanent set or curl therein as shown in FIG. 3 of the drawings. The vanes 22 thus are of arcuate shape in section and they may have a vertically extending attaching rib or flange 24 at one margin thereof. The ribs 24 preferably are positioned internally of the tubular device 14, and with the vanes extending therefrom in equally spaced circumferential relationship around the tubular device. The vanes may extend through slots in the tubular support means or be adhesively or suitably mechanically attached to such rotatable support means.

FIG. 3 shows the typical no load arcuate shape of one of the vanes 22 while FIGS. 4 and 5 indicate the deflection or change of shape that can occur when winds of varied force contact the vanes in the manner indicated.

A guide bushing 40 on the support 20 engages a hub 42 at the lower end of the support means 14 to aid in rotatably positioning the hollow cylindrical support means 14.

In order to obtain power from rotation of the tubular device 14 in the windmill 10, a suitable power generating means, such as an automobile alternator 26, or the like, is operatively associated with the windmill. The alternator 26 includes a rotor 28 rotatably positioned within a stator portion 30 of the alternator which is suitably secured to the support 20. The rotor 28 is positioned on, or operatively engaged with, the support shaft 12 whereby rotation of the tubular device 14 by winds engaging the windmill will provide a power source for the alternator 26. Conventional leads 32 extend from this alternator 26 to an external device for use of the power provided from the windmill of the invention.

An unbalance is created in the tubular device 14 and the vanes 22 carried thereon because of the change in radial lengths and shapes of the different vanes 22 and dependent upon whether or not the wind is striking the vanes to be engaged with the concave side thereof as indicated in FIG. 4. The vanes are of such semi-rigid shape or form that excessive winds such as 30 to 40 mph. will bend the windmill vanes to a convex shape as shown in FIG. 5. Then the effective radius and arcuate shape of the vane, as indicated in FIG. 2, is reduced and the effective radius of the vanes 22a and 22b are in effect enlarged whereby the windmill is unbalanced by the wind forces. The unbalance also results from the wind striking the convex surface of the vane 22c as shown in FIG. 2 and tightening the arc of such vane but basically because the wind contacts the convex vane surface. Hence, the tubular device 14 will rotate rapidly due to the wind pressures exerted thereon.

By the present invention, a relatively inexpensive, uncomplicated windmill has been provided, and it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. A windmill comprising
a support member,
a vertically positioned support shaft means operatively and rotatably positioned on said support member,
a plurality of elongated molded plastic vanes of arcuate shape and of uniform thickness in horizontal section operatively secured at one edge thereof to said support shaft means and extending outwardly therefrom, said vanes being equally spaced circumferentially about said shaft and being slightly flexible so winds engaging the concave surface of said vanes will urge said vanes to a flatter shape and will make the arc of other vanes tighter by engaging the convex surfaces of such other vanes to provide rotational forces on said vanes and provide an automatic feathering of the vanes, and
generator means positioned on said support member and operatively connected to said shaft means to provide power therefrom on rotation of said shaft means,
said vanes being semi-rigid and being deflected varied amounts by winds of different velocities whereby a variable feathering action is provided in said vanes, which have no moving parts, dependent upon the prevailing velocity, said vanes being more resistant to deflection by fluid forces engaging their concave surfaces than by fluid forces engaging their convex surfaces.

2. A windmill comprising
a support means including a vertically positioned support member having a vertical rotary axis,
a plurality of elongated molded vertically extending resilient molded plastic vanes of arcuate shape in horizontal section and having vertically extending attachment edge portions secured to said support member, the remainder of the vanes extending out beyond the periphery of said support member, said vanes each having a concave face and a convex face, said vanes being equally spaced circumferentially about said support member, and
a generator means positioned on said support means and operatively connecting to said support member to provide power therefrom on rotation of said support member,
said vanes being semi-rigid and deflectable by wind engaging the same but being more resistant to deflection by winds contacting said concave face than by winds contacting said convex face, said vanes each being of uniform thickness in cross section in the length thereof extending from said edge portion.

* * * * *